United States Patent
Kishida

(10) Patent No.: US 12,442,876 B2
(45) Date of Patent: Oct. 14, 2025

(54) MAGNETIC SENSOR, DETECTION UNIT, DETECTION SYSTEM, SUBSTRATE FOR MAGNETIC SENSOR, WAVEGUIDE BODY FOR MAGNETIC SENSOR, OPTO-ELECTRIC HYBRID SUBSTRATE FOR MAGNETIC SENSOR, AND DETECTION SUBSTRATE FOR DETECTION UNIT

(71) Applicant: KYOCERA Corporation, Kyoto (JP)

(72) Inventor: Yuji Kishida, Tsukuba (JP)

(73) Assignee: KYOCERA Corporation, Kyoto (JP)

( * ) Notice: Subject to any disclaimer, the term of this patent is extended or adjusted under 35 U.S.C. 154(b) by 22 days.

(21) Appl. No.: 18/302,846

(22) Filed: Apr. 19, 2023

(65) Prior Publication Data
US 2023/0258754 A1 Aug. 17, 2023

Related U.S. Application Data

(63) Continuation of application No. PCT/JP2021/038101, filed on Oct. 14, 2021.

(30) Foreign Application Priority Data

Oct. 28, 2020 (JP) .................. 2020-180542

(51) Int. Cl.
*G01R 33/26* (2006.01)
*G01R 33/345* (2006.01)
*G01R 33/60* (2006.01)

(52) U.S. Cl.
CPC ........... *G01R 33/26* (2013.01); *G01R 33/345* (2013.01); *G01R 33/60* (2013.01)

(58) Field of Classification Search
CPC ...... G01R 33/02; G01R 33/032; G01R 33/24; G01R 33/26; G01R 33/60
See application file for complete search history.

(56) References Cited

U.S. PATENT DOCUMENTS 10,901,054 B1 * 1/2021 Chen ................... G01R 33/26
2011/0062957 A1 3/2011 Fu et al.
(Continued)

FOREIGN PATENT DOCUMENTS

JP 2012-121748 A 6/2012
JP 2020-038086 A 3/2020
(Continued)

OTHER PUBLICATIONS

Dmitriev Al et al: "Concept of a microscale vector magnetic field sensor based on nitrogen-vacancy centers in diamond", Journal of The Optical Society of America B,, vol. 33, No. 3, Mar. 1, 2016 (Mar. 1, 2016), XP002773654.
(Continued)

*Primary Examiner* — Steven L Yeninas
(74) *Attorney, Agent, or Firm* — Volpe Koenig

(57) ABSTRACT

A magnetic sensor includes a diamond substrate and a waveguide body in contact with the diamond substrate. The diamond substrate includes, on a surface not in contact with the waveguide body, a first layer including a diamond crystal on which an NV center is disposed and, on a surface in contact with the waveguide body, a second layer on which a conductive pattern is disposed. The waveguide body includes a line configured to transmit a microwave that generates electron spin resonance to the conductive pattern and an optical waveguide configured to transmit exciting light and fluorescence, the exciting light irradiating the diamond substrate and emitting the fluorescence in the first layer of the diamond substrate.

11 Claims, 8 Drawing Sheets

(56) References Cited

U.S. PATENT DOCUMENTS

| | | | |
|---|---|---|---|
| 2013/0147473 A1 | 6/2013 | Park et al. | |
| 2016/0174867 A1 | 6/2016 | Hatano et al. | |
| 2017/0212182 A1* | 7/2017 | Hahn | G01R 33/60 |
| 2017/0343621 A1* | 11/2017 | Hahn | G01R 33/1284 |
| 2017/0343695 A1* | 11/2017 | Stetson | G01V 3/101 |
| 2018/0203080 A1 | 7/2018 | Acosta et al. | |
| 2018/0364165 A1* | 12/2018 | Barry | G01N 21/6489 |
| 2019/0331674 A1 | 10/2019 | Connolly et al. | |
| 2021/0103010 A1* | 4/2021 | Rosenfeld | G01R 33/24 |
| 2022/0057338 A1 | 2/2022 | Hatano et al. | |
| 2023/0071162 A1 | 3/2023 | Connolly et al. | |
| 2023/0090257 A1* | 3/2023 | Stern | G01C 17/32 |

FOREIGN PATENT DOCUMENTS

| | | | |
|---|---|---|---|
| JP | 2020-514709 A | 5/2020 | |
| WO | 2020/054860 A1 | 3/2020 | |
| WO | WO-2021230868 A1 * | 11/2021 | G01N 21/6489 |

OTHER PUBLICATIONS

Kuwahata Akihiro et al: "Magnetometer with nitrogen-vacancy center in abulk diamond for detecting magnetic nanoparticles in biomedical applications", Scientific Reports, vol. 10, No. 1, Dec. 1, 2020 (Dec. 1, 2020), p. 2483, XP055907958, DOI: 10.1038/s41598-020-59064-6 Retrieved from the Internet: URL:https://www.nature.com/articles/s41598-020-59064-6.pdf.

Duan Dewen et al: "Tapered ultra-high numerical aperture optical fiber tip for nitrogen vacancy ensembles based endoscope in a fluidic environment", Applied Physics Letters, American Institute of Physics, 2 Huntington Quadrangle, Melville, NY 11747, vol. 116, No. 11, Mar. 16, 2020 (Mar. 16, 2020), XP012255038, ISSN: 0003-6951, DOI: 10.1063/1.5140785 [retrieved on Mar. 16, 2020].

Doudou Zheng et al: "A hand-held magnetometer based on an ensemble of nitrogen-vacancy centers in diamond", Journal of Physics D: Applied Physics, Institute of Physicpublishing, Bristol, GB, vol. 53, No. 15, Feb. 11, 2020 (Feb. 11, 2020), p. 155004, XP020352447, ISSN: 0022-3727, DOI: 10.1088/1361-6463/AB6AF2 [retrieved on Feb. 11, 2020].

Shai Maayani et al: "Distributed Quantum Fiber Magnetometry", arxiv.org, Cornell University Library, 201 Olin Library Cornell University Ithaca, NY 14853, Apr. 23, 2019 (Apr. 23, 2019), XP081446152.

* cited by examiner

MAGNETIC SENSOR, DETECTION UNIT, DETECTION SYSTEM, SUBSTRATE FOR MAGNETIC SENSOR, WAVEGUIDE BODY FOR MAGNETIC SENSOR, OPTO-ELECTRIC HYBRID SUBSTRATE FOR MAGNETIC SENSOR, AND DETECTION SUBSTRATE FOR DETECTION UNIT

TECHNICAL FIELD

The present disclosure relates to a magnetic sensor, a detection unit, a detection system, a substrate for a magnetic sensor, a waveguide body for a magnetic sensor, an opto-electric hybrid substrate for a magnetic sensor, and a detection substrate for a detection unit.

BACKGROUND OF INVENTION

Patent Document 1 discloses a magnetic sensor using a quantum effect of a nitrogen vacancy (NV) center present in a diamond crystal.

CITATION LIST

Patent Literature

Patent Document 1: JP 2012-121748 A

SUMMARY OF THE INVENTION

In one aspect, a magnetic sensor includes a substrate and a waveguide body in contact with the substrate. The substrate includes, on a surface not in contact with the waveguide body, a first layer including a diamond crystal in which an NV center is disposed and, on a surface in contact with the waveguide body, a second layer on which a conductive pattern is disposed. The waveguide body includes a line configured to transmit a microwave that generates electron spin resonance to the conductive pattern; and an optical waveguide configured to transmit exciting light and fluorescence, the exciting light irradiating the first layer of the substrate and emitting the fluorescence. The fluorescence has light intensity changed by electron spin resonance in the first layer of the substrate.

In one aspect, a magnetic sensor includes a plurality of substrates and an opto-electric hybrid substrate in contact with each of the plurality of substrates. Each of the plurality of substrates includes, on a surface not in contact with the opto-electric hybrid substrate, a first layer including a diamond crystal in which an NV center is disposed and, on a surface in contact with the opto-electric hybrid substrate, a second layer on which an electrode pattern is disposed. The opto-electric hybrid substrate includes a line configured to transmit a microwave that generates electron spin resonance to the electrode pattern on each of the plurality of substrates and an optical waveguide configured to transmit, to each of the plurality of substrates, exciting light with which the first layer of the substrate is irradiated and fluorescence emitted by the exciting light. The fluorescence has light intensity changed by electron spin resonance in the first layer of the substrate.

In one aspect, a detection unit includes a first substrate; and a second substrate in contact with the first substrate. The detection unit is configured to irradiate the first substrate with a microwave that generates electron spin resonance and exciting light. The first substrate includes a layer including a diamond crystal in which an NV center is disposed. The second substrate includes a magnetic bead that is disposed at one end of a surface facing the first substrate and moves in a direction of the other end by drop of sample liquid and a binding portion that is a part of the surface facing the first substrate. The magnetic bead includes a secondary antibody immobilized, and a primary antibody being disposed in the binding portion, the primary antibody binding to an antigen contained in the sample liquid bound to the magnetic bead.

In one aspect, a detection system includes the above-described magnetic sensor or the above-described detection unit, a signal generator configured to generate and output a microwave signal, a light emitting element configured to generate exciting light, a light receiving element configured to receive fluorescence of the NV center, and a signal processing controller configured to process signals of the signal generator, the light emitting element, and the light receiving element and output a result.

In one aspect, a substrate for a magnetic sensor includes, on a surface not in contact with a waveguide body, a first layer including a diamond crystal in which an NV center is disposed and, on a surface in contact with the waveguide body, a second layer on which a conductive pattern is disposed.

In one aspect, a waveguide body for a magnetic sensor includes a line configured to transmit a microwave that generates electron spin resonance to a conductive pattern disposed on a second layer of a substrate and an optical waveguide configured to transmit exciting light and fluorescence, the exciting light irradiating a first layer of the substrate and emitting the fluorescent. The first layer includes a diamond crystal in which an NV center is disposed, and the fluorescence has light intensity changed by electron spin resonance in the first layer of the substrate.

In one aspect, an opto-electric hybrid substrate for a magnetic sensor is in contact with an individual substrate. The opto-electric hybrid substrate includes: a line configured to transmit a microwave that generates electron spin resonance to an electrode pattern on the individual substrate and an optical waveguide configured to transmit, to the individual substrate, exciting light with which a first layer of the substrate is irradiated, and fluorescence emitted by the exciting light. The fluorescence has light intensity changed by electron spin resonance in the first layer of the substrate.

In one aspect, a detection substrate for a detection unit includes a magnetic bead that is disposed at one end of a surface facing a probe substrate including a first layer including a diamond crystal in which an NV center is disposed and moves in a direction of the other end by drop of sample liquid and a binding portion that is a part of the surface facing the probe substrate. The magnetic bead includes a secondary antibody immobilized, and a primary antibody being disposed in the binding portion, the primary antibody binding to an antigen contained in the sample liquid bound to the magnetic bead.

DESCRIPTION OF THE INVENTION

The NV center is a complex defect in which a portion where carbon supposed to be originally present is substituted with nitrogen and a vacancy is present at an adjacent position in a diamond crystal. In the NV center, some of degenerate shared electron pairs are lost. The NV center has electrons with orbital angular momentum at two levels, m=0 and m=±1, in a zero magnetic field. Since the electrons of m=±1 have a magnetic moment, the electrons are affected by an external magnetic field, have the degeneracy of m=±1 released, and further have two energy levels. An intensity of the external magnetic field can be detected by detecting electron spin resonance caused by these states by using a light wave and a microwave.

Electrons in the NV center are excited by light having a wavelength of 532 nm and emit fluorescence having a wavelength of 638 nm in a process of relaxation. This fluorescent process is unlikely to occur at an electron spin resonance frequency. Therefore, using this property allows a state of the electrons of m=±1 to be observed. In a diamond NV center, the electron spin resonance frequency at the zero magnetic field is known to be about 2.87 GHz. When a microwave having a frequency of this resonance point (resonance frequency) is irradiated, the fluorescence having a wavelength of 638 nm is quenched. The resonance frequency of the microwave is changed by a change in the state of the electrons of m=±1 according to magnitude of the external magnetic field or the like. The magnetic field can be detected by capturing this change from a frequency change of fluorescence intensity.

In the technique described in Patent Document 1, input and output of a microwave and a light wave to and from the NV center of the diamond crystal are performed by spatial propagation. This has room for improvement in incidence efficiency of the light wave and the microwave to the NV center of the diamond crystal.

A magnetic sensor 10 according to the first embodiment will be described below.

First Embodiment

Magnetic Sensor

Figure 1:
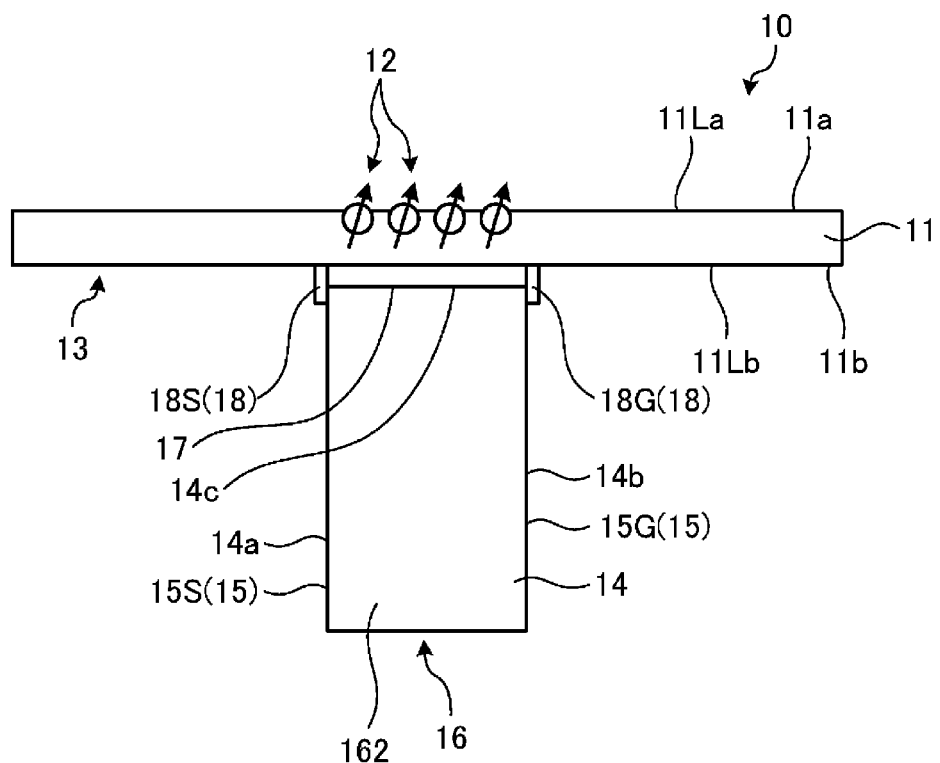
FIG. 1 is a front view of a magnetic sensor according to a first embodiment.
Figure 2:
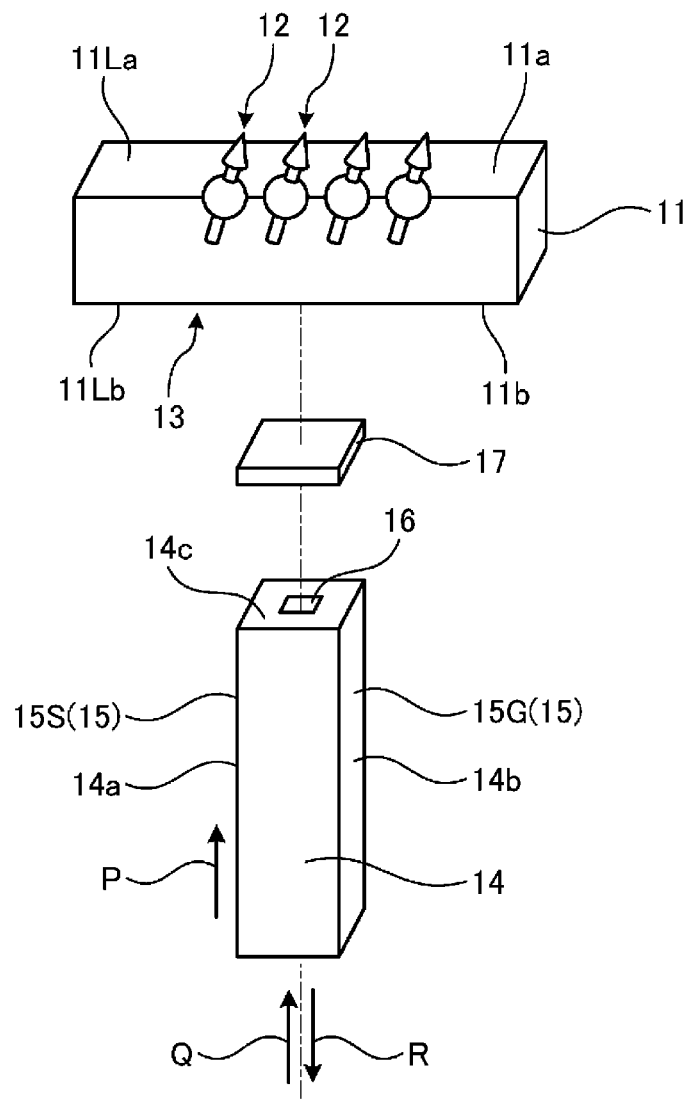
FIG. 2 is an exploded perspective view of the magnetic sensor according to the first embodiment.

FIG. 1 is a front view of the magnetic sensor 10 according to the first embodiment. FIG. 2 is an exploded perspective view of the magnetic sensor 10 according to the first embodiment. As illustrated in FIG. 1 and FIG. 2, the magnetic sensor 10 includes a diamond substrate (substrate) 11 and a waveguide body 14 in contact with the diamond substrate 11. In the present embodiment, being in contact with the diamond substrate 11 includes a state in which a matching material 17 and solder 18 described later are interposed therebetween. In the present embodiment, the diamond substrate 11 and the waveguide body 14 are bonded to each other by the matching material 17 and the solder 18.

The diamond substrate 11 is a so-called diamond sensor. The diamond substrate 11 includes a surface 11a that is not in contact with the waveguide body 14 and a surface 11b that is in contact with the waveguide body 14. The surfaces 11a and 11b are disposed facing each other. The diamond substrate 11 includes a first layer 11La and a second layer 11Lb. More specifically, the diamond substrate 11 includes, on the surface 11a, the first layer 11La including a diamond crystal in which an NV center 12 is disposed. The diamond substrate 11 includes, on the surface 11b, the second layer 11Lb on which a conductive pattern 13 is disposed.

A single NV center 12 may be disposed, or a plurality of NV centers 12 may be arranged. In the present embodiment, FIG. 1 and the like illustrate a state in which the plurality of NV centers 12 are arranged.

Figure 3:
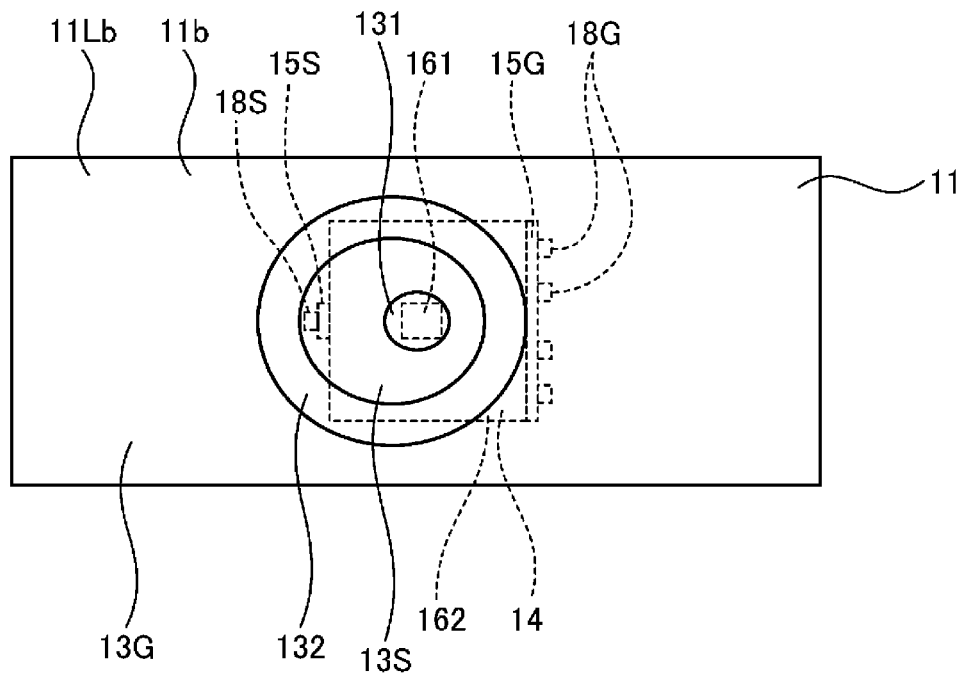
FIG. 3 is a schematic view illustrating the magnetic sensor according to the first embodiment.

FIG. 3 is a schematic view illustrating the magnetic sensor 10 according to the first embodiment. As illustrated in FIG. 3, the conductive pattern 13 is disposed on the second layer 11Lb of diamond substrate 11. The conductive pattern 13 includes a conductive pattern (first conductive pattern) 13S through which a signal of a microwave is transmitted and a conductive pattern (second conductive pattern) 13G which is grounded. A microwave transmitted through a line 15 is transmitted to the conductive pattern 13.

The conductive pattern 13S is formed in an annular shape in a central portion of the second layer 11Lb. An opening portion 131 having a circular shape is disposed at a center portion of the conductive pattern 13S. The surface 11b of the diamond substrate 11 is exposed from the opening portion 131. The conductive pattern 13G is disposed around the conductive pattern 13S of the second layer 11Lb. An opening portion 132 having an annular shape is disposed between the conductive pattern 13S and the conductive pattern 13G. The surface 11b of the diamond substrate 11 is exposed in the opening portion 132.

The conductive pattern 13S is connected to a conductor 15S, which is a signal line for transmitting a signal, via solder 18S. The conductive pattern 13G is connected to a conductor 15G, which is a ground line, via solder 18G. A plurality of pieces of solder 18G may be disposed in a width direction of the conductor 15G. When viewed in an axial direction, an optical waveguide 16 is located in the opening portion 131. The exciting light with which the diamond substrate 11 is irradiated and the fluorescence emitted by the exciting light in first layer 11La of the diamond substrate 11 are transmitted through the opening portion 131. The matching material 17 is interposed between the opening portion 131 and the optical waveguide 16.

Figure 4:
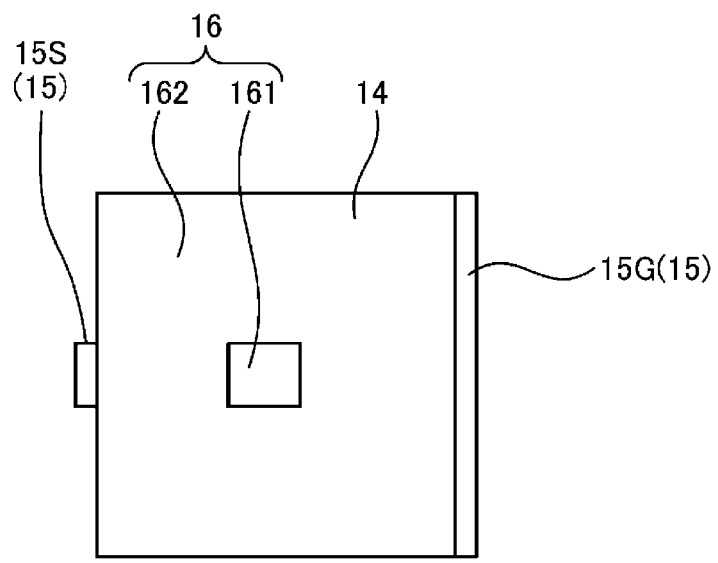
FIG. 4 is a plan view of a waveguide body of the magnetic sensor according to the first embodiment.

FIG. 4 is a plan view of the waveguide body 14 of the magnetic sensor 10 according to the first embodiment. As illustrated in FIG. 4, the waveguide body 14 includes the line 15 and the optical waveguide 16. The waveguide body 14 is made of, for example, $SiO_2$, a glass material, or a resin material such as polymer. In the present embodiment, the waveguide body 14 is formed with a cross section having a rectangular pillar shape in the axial direction. The waveguide body 14 includes a side surface 14a and a side surface 14b disposed opposite the side surface 14a.

The line 15 is a microstrip line through which a microwave that generates the electron spin resonance is transmitted to the conductive pattern 13. A characteristic impedance of the line 15 is adjusted. The line 15 includes the conductor 15S that is a signal line and the conductor 15G that is a ground pattern. The conductor 15S is disposed on the side surface 14a. The conductor 15G is disposed on the side surface 14b. The line 15 is disposed along the axial direction of the waveguide body 14. The line 15 is disposed in parallel to a core 161 of the optical waveguide 16.

The optical waveguide 16 performs single-mode wave guidance or multi-mode wave guidance. The optical waveguide 16 transmits the exciting light with which the diamond substrate 11 is irradiated and the fluorescence emitted by the exciting light in the first layer 11La of the diamond substrate 11. The optical waveguide 16 includes a core 161 disposed at the center portion and a cladding region 162 disposed around the core 161. An index of refraction of the core 161 is higher than that of the cladding region 162. The core 161 is transparent to the exciting light and the fluorescence. The core 161 is disposed along the axial direction of the waveguide body 14. In the present embodiment, the core 161 and the cladding region 162 are formed with a cross section having a rectangular pillar shape in the axial direction. The core 161 is disposed along the axial direction of the waveguide body 14. The core 161 is disposed in parallel to the line 15.

The diamond substrate 11 and the waveguide body 14 are connected via the matching material 17. More specifically, the surface 11b of the diamond substrate 11 and the surface 12c of the waveguide body 14 are connected via the matching material 17. The matching material 17 is a material that adjusts and matches the indexes of refraction of the diamond substrate 11 and the optical waveguide 16. The matching material 17 has the index of refraction same as, and/or similar to the index of refraction of the diamond substrate 11. As the matching material 17, for example, a material such as resin having the index of refraction same as, and/or similar to that of the core 161 of the optical waveguide 16 may be used. The index of refraction of the matching material 17 is, for example, about not less than 1.7 and not more than 2.5. The matching material 17 has the same shape as the surface 12c of the waveguide body 14 when viewed in the axial direction.

The magnetic sensor 10 configured as described above can be used as a probe of a detection system.

Control Device

Figure 5:
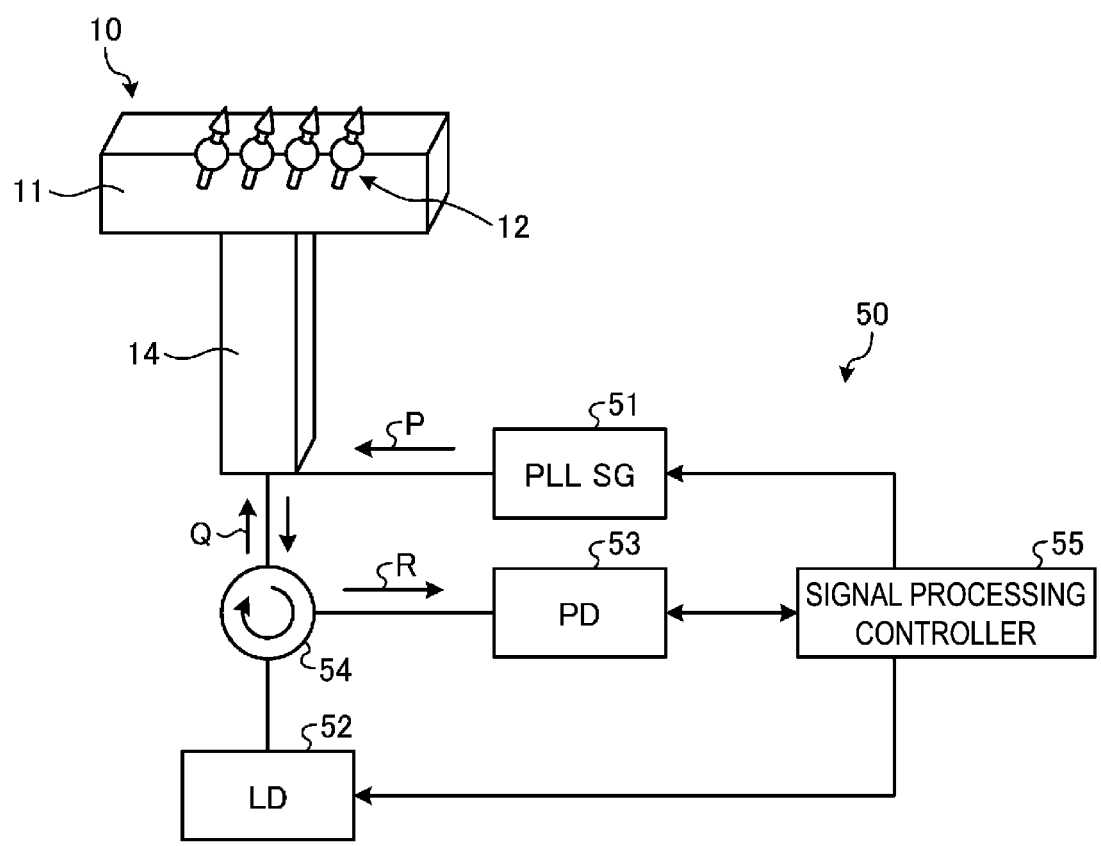
FIG. 5 is a schematic block diagram of a detection system using the magnetic sensor according to the first embodiment.

FIG. 5 is a schematic block diagram of a detection system using the magnetic sensor 10 according to the first embodiment. The detection system includes the magnetic sensor 10 and a control device 50. The magnetic sensor 10 is controlled by the control device 50. The control device 50 includes a signal generator 51, a light emitting element 52, a light receiving element 53, an optical isolator 54, and a signal processing controller 55.

The signal generator 51 generates a microwave signal and outputs it to the line 15 under the control of the signal processing controller 55. The signal generator 51 generates a microwave of, for example, not less than 2.7 GHz or not more than 2.9 GHz. The light emitting element 52 is a laser diode. Under the control of the signal processing controller 55, the light emitting element 52 emits, for example, a laser beam having a wave length 527 nm to the optical waveguide 16. The light emitting element 52 emits green exciting light to the optical waveguide 16. The light receiving element 53 is a photodiode. The light receiving element 53 receives the fluorescence of the NV center 12 of the diamond substrate 11 under the control of the signal processing controller 55. The light receiving element 53 receives the fluorescence through the optical waveguide 16. The optical isolator 54 is disposed between the optical waveguide 16, the light emitting element 52, and the light receiving element 53. The optical isolator 54 outputs a light wave output from the light emitting element 52 to the optical waveguide 16. The optical isolator 54 outputs a light wave input from the optical waveguide 16 to the light receiving element 53.

The signal processing controller 55 processes signals of the signal generator 51, the light emitting element 52, and the light receiving element 53 and outputs the result. More specifically, the signal processing controller 55 controls generation of signals in the signal generator 51. The signal processing controller 55 controls light emission of the light emitting element 52. The signal processing controller 55 controls light reception of the light receiving element 53. The signal processing controller 55 processes signals of red fluorescence received by the light receiving element 53. The signal processing controller 55 outputs the strength of the magnetic field as a result.

Effects

Accordingly, in the present embodiment, the light wave and the microwave substantially coaxially propagate through the waveguide body 14. In the present embodiment, the diamond substrate 11 including the minute NV center 12 is disposed in a probe shape at a tip end portion of the waveguide body 14. In the present embodiment, the diamond substrate 11 including the NV center 12 irradiates the light wave and the microwave with low loss and most of the return light can be received. The present embodiment enables signal access with the plurality of NV centers 12 having a minute size without loss. As described above, the present embodiment can improve the incidence efficiency of the light wave and the microwave to the NV center 12 of the diamond substrate 11.

In the present embodiment, the light wave and the microwave can be aligned and connected at once to a region of the diamond substrate 11 where the NV center 12 is disposed. In the present embodiment, the light wave and the microwave can be stably propagated without loss.

In the present embodiment, no obstacle such as a cover glass is required on the surface 11a side of the diamond substrate 11. According to the present embodiment, the magnetic sensor 10 can be brought close to a measured object to measure it. According to the present embodiment, the magnetic sensor 10 can detect magnetic charge of the measured object with high sensitivity.

According to the present embodiment, the diamond substrate 11 including the NV center 12 having a minute size can be brought close to minute magnetic charge to detect the minute magnetic charge with high sensitivity. When, for example, the minute magnetic charge is brought close to the NV center 12 within 1 µm, a magnetic moment of about $1 \times 10^{-23}$ Wb·m or less can be detected. A region where the NV center 12 can detect the magnetic moment is, for example, 1 µm or narrower.

According to the present embodiment, in the magnetic sensor 10, transmission paths of the light wave and the microwave can be robust and small. Therefore, the present embodiment enables the incidence efficiency of the light wave and the microwave to be stabilized without readjustment. The present embodiment can advantageously achieve miniaturization of the sensor, unit, system, and the like. The present embodiment can be used for sensing very small regions.

On the other hand, a conventional sensor has a large detector. Accordingly, in the conventional sensor, the distance between the magnetic charge and the detector increases, and spatial distribution variation of the magnetic charge cannot be sufficiently captured.

Second Embodiment

Figure 6:
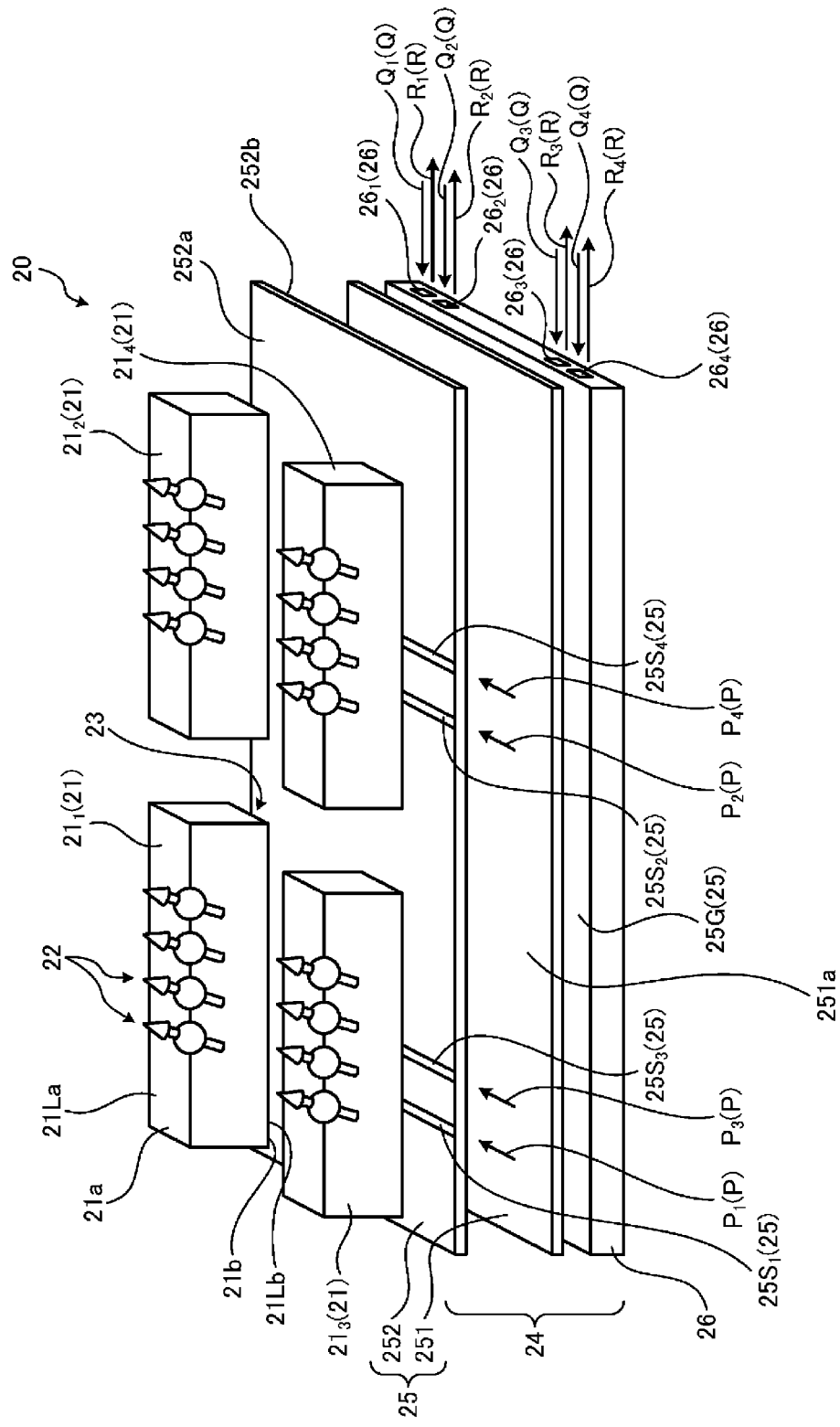
FIG. 6 is an exploded perspective view of a magnetic sensor according to a second embodiment.
Figure 7:
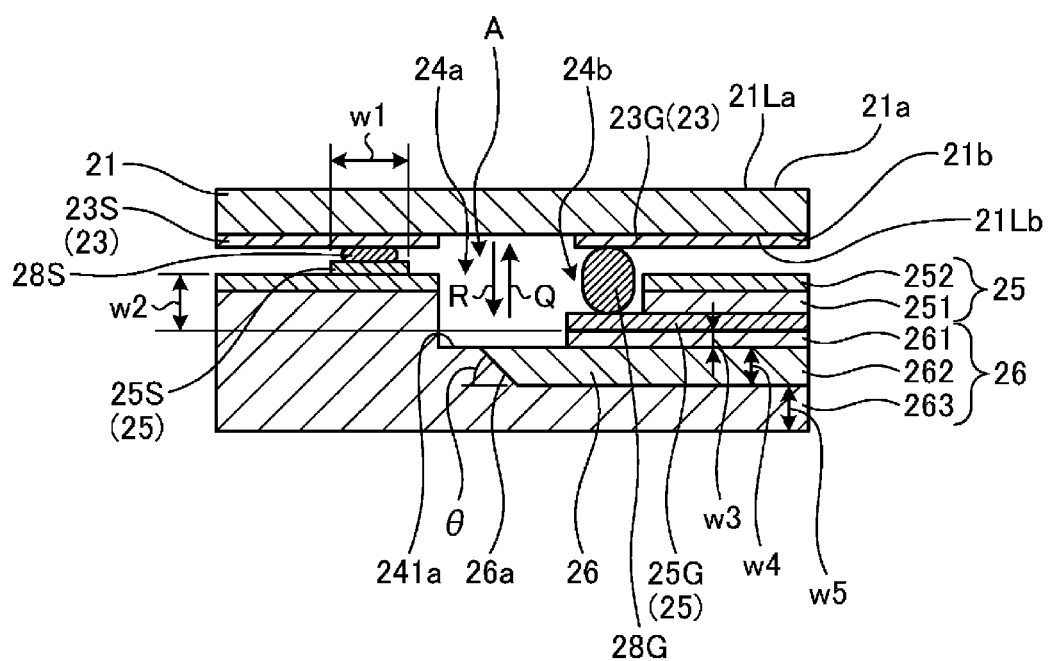
FIG. 7 is a cross-sectional view of the magnetic sensor according to the second embodiment.

FIG. 6 is an exploded perspective view of a magnetic sensor 20 according to the second embodiment. FIG. 7 is a cross-sectional view of the magnetic sensor 20 according to the second embodiment. In the present embodiment, the magnetic sensor 20 includes a plurality of diamond substrates 21 and one opto-electric hybrid substrate 24 in contact with each of the diamond substrates 21. In the present embodiment, being in contact with each of the diamond substrates 21 includes a state in which solder 28S and solder 28G described later, a matching material (not illustrated), and the like are interposed therebetween.

In the present embodiment, the magnetic sensor 20 includes the plurality of diamond substrates 21 disposed on the opto-electric hybrid substrate 24. In the present embodiment, four diamond substrates $21_1$, $21_2$, $21_3$, and $21_4$ are disposed on the opto-electric hybrid substrate 24. When the diamond substrate $21_1$, the diamond substrate $21_2$, the diamond substrate $21_3$, and the diamond substrate $21_4$ do not need to be distinguished from each other, the four diamond substrates $21_1$, $21_2$, $21_3$, and $21_4$ are referred to as the diamond substrate 21. Each diamond substrate 21 is configured in a manner same as and/or similar to the diamond substrate 11 of the first embodiment.

The diamond substrate 21 includes, on a surface 21a not in contact with the opto-electric hybrid substrate 24, a first layer 21La including a diamond crystal in which an NV center 22 is disposed. The diamond substrate 21 includes, on a surface 21b in contact with the opto-electric hybrid substrate 24, a second layer 21Lb on which an electrode pattern 23 is disposed. The electrode pattern 23 includes an electrode pattern (first electrode pattern) 23S through which a signal of a microwave is transmitted, an electrode pattern (second electrode pattern) 23G which is grounded, and an opening portion (not illustrated) through which fluorescence emitted by exciting light is transmitted.

In the opto-electric hybrid substrate 24, a line layer (line) 25 functioning as a line and an optical waveguide layer (optical waveguide) 26 functioning as an optical waveguide are laminated. In the present embodiment, the line layer 25 is laminated on the optical waveguide layer 26. The opto-electric hybrid substrate 24 includes the line layer 25 disposed facing the diamond substrate 21. The opto-electric hybrid substrate 24 and the diamond substrate 21 are connected to each other via the solder 28S and the solder 28G. The opto-electric hybrid substrate 24 includes a first recessed portion 24a and a second recessed portion 24b at a placement position of each diamond substrate 21. The first recessed portion 24a and the second recessed portion 24b are recessed from a surface of the opto-electric hybrid substrate 24, in other words, from a surface 252a of a second substrate 252 of the line layer 25. The first recessed portion 24a is recessed deeper than the second recessed portion 24b. A surface 241a of the first recessed portion 24a is disposed parallel to the surface 21b of the diamond substrate 21. In the first recessed portion 24a, a mirror surface 26a provided at a tip end portion of the optical waveguide layer 26 described later is exposed. In the second recessed portion 24b, a conductor 25G of the line layer 25 described later is exposed.

The line layer 25 includes a microstrip line through which a microwave that generates electron spin resonance is transmitted to the electrode pattern 23 on each of the diamond substrates 21. The line layer 25 includes a first substrate 251 and a second substrate 252. The second substrate 252 is laminated on the first substrate 251. The line layer 25 includes a conductor (line) 25S which is a signal line and a conductor (line) 25G which is a ground pattern. Conductors 25S are disposed on the surface 252a of the second substrate 252. The conductors 25S includes a conductor $25S_1$, a conductor $25S_2$, a conductor $25S_3$, and a conductor $25S_4$. The conductor $25S_1$ transmits the microwave to an electrode pattern 23S of the diamond substrate $21_1$. The conductor $25S_2$ transmits the microwave to the electrode pattern 23S of the diamond substrate $21_2$. The conductor $25S_3$ transmits the microwave to the electrode pattern 23S of the diamond substrate $21_3$. The conductor $25S_4$ transmits the microwave to the electrode pattern 23S of the diamond substrate $21_4$. When the conductor $25S_1$, the conductor $25S_2$, the conductor $25S_3$, and the conductor $25S_4$ do not need to be distinguished from each other, the conductor $25S_1$, the conductor $25S_2$, the conductor $25S_3$, and the conductor $25S_4$ are referred to as the conductor 25S. The conductor 25G is disposed between a lower surface of the first substrate 251 and the optical waveguide layer 26. The conductor 25G transmits the microwave to electrode patterns 23G of the diamond substrate $21_1$, the diamond substrate $21_2$, the diamond substrate $21_3$, and the diamond substrate $21_4$.

The conductor 25S has a width w1 of, for example, not less than 30 μm and not more than 60 μm in a direction orthogonal to a transmission direction of the microwave. A width w2 in the laminating direction between the conductor 25S and the conductor 25G is, for example, not less than 30 μm and not more than 60 μm.

The optical waveguide layer 26 performs single-mode waveguide or multi-mode waveguide. The optical waveguide layer 26 includes an optical waveguide $26_1$, an optical waveguide $26_2$, an optical waveguide $26_3$, and an optical waveguide $26_4$. The optical waveguide layer 26 transmits the exciting light with which the diamond substrate 21 is irradiated and the fluorescence emitted by the exciting light in the first layer 21La of the diamond substrate 21 to each of the diamond substrates 21. More specifically, the optical waveguide $26_1$ transmits the exciting light with which the diamond substrate $21_1$ is irradiated and the fluorescence caused by the exciting light in a first layer $21_1$La of the diamond substrate $21_1$. The optical waveguide $26_2$ transmits the exciting light with which the diamond substrate $21_2$ is irradiated and the fluorescence caused by the exciting light in a first layer $21_2$La of the diamond substrate $21_2$. The optical waveguide $26_3$ transmits the exciting light with which the diamond substrate $21_3$ is irradiated and the fluorescence caused by the exciting light in a first layer $21_3$La of the diamond substrate $21_3$. The optical waveguide $26_4$ transmits the exciting light with which the diamond substrate $21_4$ is irradiated and the fluorescence caused by the exciting light in a first layer $21_4$La of the diamond substrate $21_4$.

The optical waveguide layer 26 has a coaxial structure including a lower cladding region 261, a core 262, and upper and side cladding regions 263. Since the index of refraction of the core 262 is higher than that of the lower cladding region 261 and the upper and side cladding regions 263 by several percent or more, an optical signal can be confined in the core and transmitted with low loss.

The lower cladding region 261 has a width w3 in the laminating direction of not less than 15 μm and not more than 25 μm, for example. The core 262 has a width w4 in the laminating direction of not less than 35 μm and not more than 100 μm, for example. The upper and side cladding regions 263 has a width w5 in the laminating direction of not less than 15 μm and not more than 25 μm, for example.

The mirror surface 26a includes an optical path conversion surface inclined with respect to an optical axis direction of the core 262. The mirror surface 26a is an optical path conversion surface inclined at, for example, 45° with respect to the optical axis direction. This optical path conversion surface converts an optical path direction of the light traveling through the core 262 by 90° and changes the optical path to a normal direction perpendicular to a surface 251a of the first substrate 251. In the second recessed portion 24b, a part of the conductor 25G is exposed.

In order to further reduce generation of transmission loss of light, a space A where the mirror surface 26a is exposed may be filled with a matching material such as resin. The transmission loss of light between the optical waveguide layer 26 and the diamond substrate 11 can be reduced. As the matching material, for example, resin having an index of refraction same as and/or similar to that of the core 262 of the optical waveguide layer 26 may be used.

The mirror surface 26a of the optical waveguide layer 26 is inclined with respect to the surface 24a of the first recessed portion 241a. An inclination angle θ is, for example, 45°. Since the mirror surface 26a of the optical waveguide layer 26 is inclined, propagation of light between the optical waveguide layer 26 and the diamond substrate 21 can be efficiently performed.

The opto-electric hybrid substrate 24 and the diamond substrate 21 configured as described above are connected to each other via the solder 28S and the solder 28G. More specifically, the solder 28S connects the electrode pattern 23S of the diamond substrate 21 and the conductor 25S of the line layer 25. The solder 28G connects the electrode pattern 23G of the diamond substrate 21 and the conductor 25G of the line layer 25.

The magnetic sensor 20 configured as described above can be used as a probe of a detection system as in the first embodiment by including the control device 50.

As described above, the present embodiment can arrange the plurality of NV centers 12 having a minute size by disposing the plurality of diamond substrates 21 on the opto-electric hybrid substrate 24. According to the present embodiment, the magnetic sensor 20 can be more highly integrated than the magnetic sensor 10. According to the present embodiment, the magnetic sensor 20 can capture the spatial distribution variation of the magnetic charge having a minute size with high resolution. According to the present embodiment, the magnetic sensor 20 can dynamically image movement of a specific protein, biological substance, or the like by being combined with, for example, a nuclear magnetic resonance phenomenon or the like.

Third Embodiment

Figure 8:
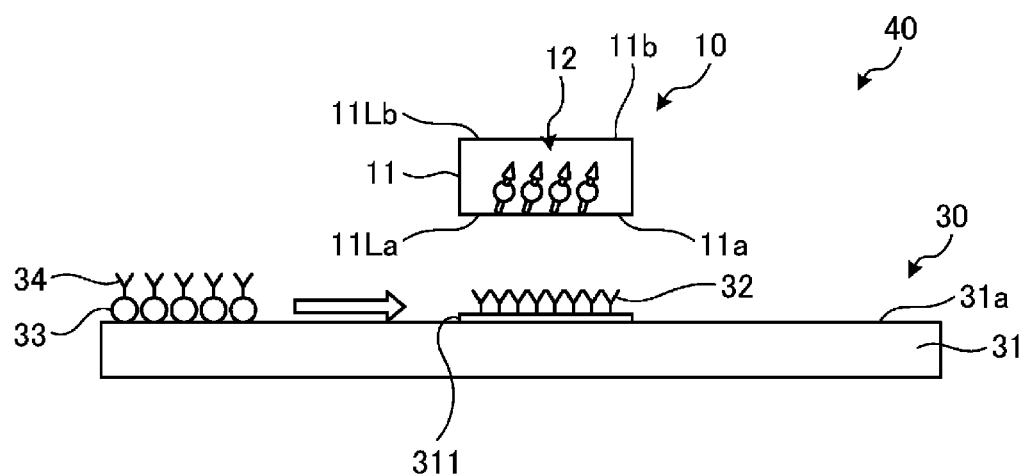
FIG. 8 is a schematic diagram of a detection unit according to a third embodiment.
Figure 9:
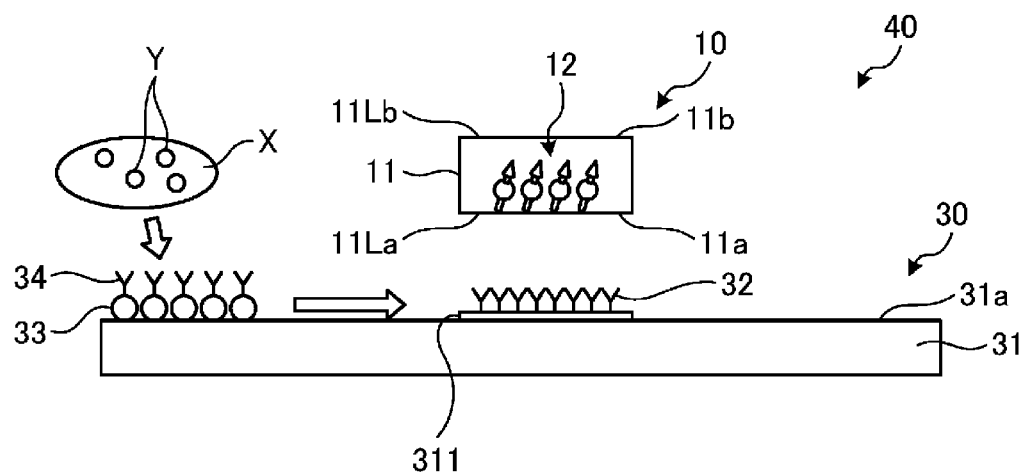
FIG. 9 is a diagram illustrating a detection step using the detection unit according to the third embodiment.
Figure 10:
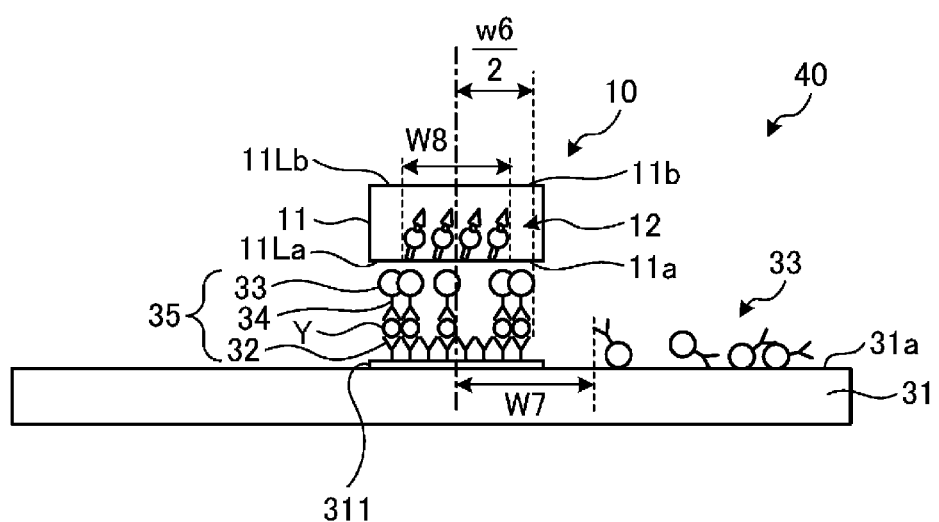
FIG. 10 is a diagram illustrating a detection step using the detection unit according to the third embodiment.

FIG. 8 is a schematic diagram of a detection unit 40 according to the third embodiment. FIG. 9 is a diagram illustrating a detection step using the detection unit 40 according to the third embodiment. FIG. 10 is a diagram illustrating a detection step using the detection unit 40 according to the third embodiment. The detection unit 40 detects an antigen Y contained in sample liquid X. As illustrated in FIG. 8, the detection unit 40 includes the magnetic sensor 10 and a substrate (second substrate, detection substrate for detection unit) 30. In the present embodiment, as an example, the magnetic sensor 10 is described as being configured in the same manner as in the first embodiment. In the present embodiment, the first substrate is the diamond substrate 11 of the magnetic sensor 10.

The substrate 30 includes a strip substrate 31, a primary antibody 32 immobilized on a test line 311 provided on the strip substrate 31, a magnetic bead 33 movably disposed on a surface 31a of the strip substrate 31, and a secondary antibody 34 immobilized on the magnetic bead 33.

The strip substrate 31 functions as a preparation in the detection unit 40. The strip substrate 31 is formed in a plate-like shape. The test line 311 is disposed at a center portion of the surface 31a of the strip substrate 31.

The primary antibody 32 is a primary antibody of the antigen Y. The magnetic bead 33 is disposed at one end of the surface 31a of the strip substrate 31 facing the diamond substrate 11. The magnetic bead 33 is immobilized with the secondary antibody 34 which moves in a direction of the other end by a drop of the sample liquid X. The secondary antibody 34 is a secondary antibody of the antigen Y. The primary antibody 32 is disposed away from the magnetic bead 33 and the secondary antibody 34.

The substrate 30 further includes a binding portion 35 which is a part of the surface 31a of the strip substrate 31 facing the diamond substrate 11. The primary antibody 32 that binds to the antigen Y contained in the sample liquid X bound to the magnetic bead 33 is disposed in the binding portion 35.

A method for detecting the antigen Y such as a virus using the detection unit 40 will be described. As illustrated in FIG. 9, the sample liquid X of the antigen Y such as a virus is dropped onto the magnetic bead 33 and the secondary antibody 34. The dropped sample liquid X diffuses on the strip substrate 31 while a part of the antigen Y is bound to the secondary antibody 34.

As illustrated in FIG. 10, the antigen Y bound to the secondary antibody 34 binds to the primary antibody 32 in a sandwich manner to form the binding portion 35. In the binding portion 35, the antigen Y is sandwiched between the primary antibody 32 and the secondary antibody 34. In the binding portion 35, the primary antibody 32, the antigen Y, the secondary antibody 34, and the magnetic bead 33 are disposed in this order from the side close to the strip substrate 31. In the binding portion 35, the magnetic beads 33 whose number corresponds to concentration of the antigen Y in the sample liquid X are bound. In the binding portion 35, the magnetic bead 33 is located at a position farthest from the strip substrate 31.

One-half of a width w6 of the binding portion 35 is smaller than a width w7 from the center of the binding portion 35 to a region where the magnetic beads 33 unbound are not distributed. The w6 and the w7 satisfy a relationship w6/2<w7. The w6 is, for example, not less than 0.5 mm and not more than 1.5 mm. The w7 is about, for example, 0.3 mm or more, and preferably not less than 3 mm and not less than 15 mm.

In the magnetic sensor 10, a width w8 of the NV center 12 is smaller than the width w6 of the binding portion 35. The w6 and the w8 satisfy a relationship w6>w8.

The magnetic bead 33 that is not bound to the antigen Y does not stay on the test line 311 on the strip substrate 31, and moves to the end portion on the opposite side to the position where the sample liquid X is dropped.

The strip substrate 31 may be provided with a control line on a downstream side of the test line 311 to specifically adsorb the magnetic bead 33 unbound. In this case, the w7 is a width from the center of the binding portion 35 to an end of the control line on an upstream side.

The magnetic sensor 10 serving as a detection probe is brought close to or in contact with the position where the primary antibody 32 has been immobilized. Before that, the magnetic bead 33 is magnetized by applying a magnetic field thereto. As a result, the magnetic sensor 10 strongly detects the magnetic charge of the magnetic bead 33 of the binding portion 35 which is a measured object. The magnetic sensor 10 detects the concentration according to the number of the magnetic beads 33. The signal processing controller 55 of the control device 50 calculates the strength of the magnetic field from the signal which is the detection result of the magnetic sensor 10 and outputs the calculated strength as a result.

The detection unit 40 configured as described above can be used as a detection system by including the control device 50.

Accordingly, in the present embodiment, the magnetic sensor 10 can detect the magnetic bead 33 at a position away from the magnetic bead 33 unbound. In the magnetic sensor 10, an influence of the magnetic charge of the magnetic bead 33 unbound decreases in inverse proportion to the cube of the distance. The present embodiment can improve a signal-noise (S/N) ratio of a signal by antigen-antibody binding.

In the above description, the first substrate is the diamond substrate 11 of the magnetic sensor 10, but is not limited to the configuration. The first substrate is provided with a layer (magnetic detection layer) having a detection accuracy comparable to that in using the diamond substrate 11. The magnetic detection layer of the first substrate is only required that a magnetic moment of about $1\times10^{-23}$ Wb·m or less can be detected when, for example, a minute magnetic charge is brought close to the detector of the magnetic sensor 10 within 1 µm. The magnetic detection layer of the first substrate is only required that the magnetic charge existing in a region of 1 µm or less, for example, can be detected. The first substrate may be, for example, a substrate including a magnetoresistive element, a magnetic impedance element, or a superconducting quantum interference element disposed on its surface layer.

In a conventional detection unit, sensitivity is low and insufficient, the detector has a size of several mm or more, and a sealing layer or the like covering the surface of the detector has a thickness of several 100 µm or more. Thus, to sufficiently separate a distance between the detector and the magnetic bead 33 unbound relative to a distance between the detector and the binding portion 35 when the detector is brought close to the binding portion 35 which is a measured object, the size of the substrate 30 needs to be increased, and the distance between the binding portion 35 and the region in which the magnetic beads 33 unbound are distributed needs to be increased. Thus, in addition to the large size of the detector, the size of the substrate 30 is increased, and the size of the detection unit is increased. When the detection is performed without increasing the size of the substrate 30, detection accuracy of the S/N ratio of the signal by the antigen-antibody binding decreases under the influence of the magnetic charge of the magnetic bead 33 unbound.

The present embodiment can solve the problems in the conventional detection unit as described above, reduce the size of the entire detection unit, and improve detection accuracy.

The embodiment disclosed by the present application can be modified without departing from the main point or the scope of the present invention. The embodiment disclosed by the present application and variations thereof can be combined as appropriate.

Embodiments have been described in order to fully and clearly disclose the technology according to the appended claims. However, the appended claims are not limited to the embodiments described above, and are configured to embody all variations and alternative configurations that those skilled in the art may make within the underlying matter set forth herein.

REFERENCE SIGNS

10 Magnetic sensor
11 Diamond substrate (substrate, first substrate)
11a Surface (surface not in contact with waveguide body)
11b Surface (surface in contact with waveguide body)
11La First layer
11Lb Second layer
12 NV center
13, 13S, 13G Conductive pattern
14 Waveguide body
15 Line
15S, 15G Conductor
16 Optical waveguide
17 Matching material
18S, 18G Solder
20 Magnetic sensor
21 Diamond substrate (substrate)
21a Surface (surface not in contact with opto-electric hybrid substrate)
21b Surface (surface in contact with opto-electric hybrid substrate)
21La First layer
21Lb Second layer
22 NV center
23, 23S, 23G Electrode pattern
24 Opto-electric hybrid substrate
25 Line layer (line)
25S, 25G Conductor
26 Optical waveguide layer (optical waveguide)
28S, 28G Solder
30 Substrate (second substrate, detection substrate for detection unit)
31 Strip substrate
311 Test line
32 Primary antibody
33 Magnetic bead
34 Secondary antibody
35 Binding portion
40 Detection unit
50 Control device
51 Signal generator
52 Light emitting element
53 Light receiving element
54 Optical isolator
55 Signal processing controller
X Sample liquid
Y Antigen

The invention claimed is:

1. A magnetic sensor comprising:
a substrate; and
a waveguide body in contact with the substrate,
the substrate comprising
on a surface not in contact with the waveguide body, a first layer comprising a diamond crystal in which a nitrogen vacancy (NV) center is disposed, and on a surface in contact with the waveguide body, a second layer on which a conductive pattern is disposed;
the waveguide body comprising
a line configured to transmit a microwave that generates electron spin resonance to the conductive pattern, and
an optical waveguide configured to transmit exciting light and receive fluorescence, the exciting light irradiating the first layer of the substrate and emitting the fluorescence, the fluorescence having light intensity changed by electron spin resonance in the first layer of the substrate.

2. The magnetic sensor according to claim 1, wherein the conductive pattern comprises
a first conductive pattern through which a signal of the microwave is transmitted, a second conductive pattern that is grounded, and
an opening portion through which the exciting light and the fluorescence are transmitted.

3. The magnetic sensor according to claim 1, wherein
the optical waveguide comprises a core disposed at a center portion and
a cladding region disposed around the core.

4. The magnetic sensor according to claim 1, further comprising a matching material that is interposed between the substrate and the waveguide body and is configured to adjust an index of refraction.

5. A detection system comprising:
the magnetic sensor according to claim 1;
a signal generator configured to generate and output a microwave signal;
a light emitting element configured to generate exciting light;
a light receiving element configured to receive the fluorescence of the NV center from the optical waveguide; and
a signal processing controller configured to process signals of the signal generator, the light emitting element, and the light receiving element and output a result.

6. A magnetic sensor comprising:
a plurality of substrates; and
an opto-electric hybrid substrate in contact with each of the plurality of substrates, each of the plurality of substrates comprising
on a surface not in contact with the opto-electric hybrid substrate, a first layer comprising a diamond crystal in which a nitrogen vacancy (NV) center is disposed, and
on a surface in contact with the opto-electric hybrid substrate, a second layer on which an electrode pattern is disposed;
the opto-electric hybrid substrate comprising
a line configured to transmit a microwave that generates electron spin resonance to the electrode pattern on each of the plurality of substrates, and
an optical waveguide configured to transmit, exciting light to each of each of the plurality of substrates and receive fluorescence from each of the plurality of substrates, the exciting light irradiating the first layer of the substrate and emitting the fluorescence, the fluorescence having light intensity changed by electron spin resonance in the first layer of the substrate.

7. The magnetic sensor according to claim 6, wherein
the electrode pattern comprises:
a first electrode pattern through which a signal of the microwave is transmitted,
a second electrode pattern that is grounded, and
an opening portion configured to transmit the exciting light and the fluorescence.

8. The magnetic sensor according to claim 7, wherein
the opto-electric hybrid substrate comprises
at a position in contact with each of the plurality of substrates, a first recessed portion in which a tip end portion of the optical waveguide is exposed, and
a second recessed portion in which the line is exposed.

9. A substrate for a magnetic sensor, the substrate comprising:
on a surface not in contact with a waveguide body, a first layer comprising a diamond crystal in which a nitrogen vacancy (NV) center is disposed; and
on a surface in contact with the waveguide body, a second layer on which a conductive pattern is disposed,
wherein the first layer is configured to emit a fluorescence that is transmitted through an optical waveguide in response to the second layer being irradiated by an exciting light that is transmitted through the optical waveguide, the fluorescence having light intensity changed by electron spin resonance in the first layer of the substrate.

10. A waveguide body for a magnetic sensor, the waveguide body comprising:
a line configured to transmit a microwave that generates electron spin resonance to a conductive pattern disposed on a second layer of a substrate; and
an optical waveguide configured to transmit exciting light, the exciting light irradiating a first layer of the substrate and emitting fluorescence, the first layer comprising a diamond crystal in which a nitrogen vacancy (NV) center is disposed, and the fluorescence having light intensity changed by electron spin resonance in the first layer of the substrate.

11. An opto-electric hybrid substrate for a magnetic sensor in contact with a substrate, the opto-electric hybrid substrate comprising:
a line configured to transmit a microwave that generates electron spin resonance to an electrode pattern on the substrate; and
an optical waveguide configured to transmit, to the substrate, exciting light that irradiates a first layer of the substrate and receive fluorescence, the fluorescence having light intensity changed by electron spin resonance in the first layer of the substrate.

* * * * *